(12) United States Patent
Price et al.

(10) Patent No.: US 6,765,926 B1
(45) Date of Patent: Jul. 20, 2004

(54) BIT REARRANGING UNIT FOR NETWORK DATA, METHOD FOR REARRANGING BITS, AND SOFTWARE FOR ENABLING THE SAME

(75) Inventors: Eduard A. Price, Raleigh, NC (US); John W. Hayduk, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/539,733

(22) Filed: Mar. 30, 2000

(51) Int. Cl.[7] ................................................. H04J 3/16
(52) U.S. Cl. ........................ 370/466; 370/476; 370/524; 370/537
(58) Field of Search ............................... 370/394, 412, 370/429, 476, 524, 535–544, 420, 463, 466

(56) References Cited

U.S. PATENT DOCUMENTS

| | | | | |
|---|---|---|---|---|
| 5,828,906 A | * | 10/1998 | Jeon et al. .................... | 710/65 |
| 6,289,018 B1 | * | 9/2001 | Song ........................ | 370/395.6 |
| 6,320,883 B1 | * | 11/2001 | Mitchell et al. ............ | 370/522 |
| 6,366,583 B2 | * | 4/2002 | Rowett et al. .............. | 370/401 |
| 6,393,033 B1 | * | 5/2002 | Woodward et al. ......... | 370/474 |

OTHER PUBLICATIONS

Stallings, William, ISDN and Broadband ISDN with Frame Relay and ATM, pp. 176–178, copyright 1999.*

* cited by examiner

*Primary Examiner*—Hassan Kizou
*Assistant Examiner*—Christopher M Swickhamer
(74) *Attorney, Agent, or Firm*—Marger Johnson & McCollom, PC (57) ABSTRACT

A method is provided for rendering compatible with each other devices that use the data formats BBDD and BDBD for an 18-bit word and 144 Kbs network communication. The word is divided into two B segments and two D segments. The second word segment is interchanged with the third word segment. A bit rearranging unit is placed in the path of the data. It receives a word, and retransmits it after interchanging the second segment with the third segment. A device is also provided that includes the bit rearranging unit, a controller, and memory with software made according to the invention. The software monitors whether received transmission is incompatible, and if so, directs the bit rearranging unit to switch formats.

35 Claims, 6 Drawing Sheets

BIT REARRANGING UNIT FOR NETWORK DATA, METHOD FOR REARRANGING BITS, AND SOFTWARE FOR ENABLING THE SAME

BACKGROUND OF THE INVENTION

1. Field of the Invention

The present invention is related to the field of communications through networks, and more specifically to a unit and a method for rearranging bits in data words for compatibility among different data formats, and software for enabling the same.

2. Description of the Related Art

Integrated Services Digital Networks (ISDNs) are used for the transfer of data between different users. At the local level, this is accomplished by using ISDN Digital Signal Loop (IDSL) devices, such as IDSL modems.

In communications at the rate of 144 Kbs, a collection of 18 bits defines one word. These 18 bits belong in two channels, namely the B-channel (Berr) and the D-channel. Each data word has four segments, two in the B-channel, and two in the D-channel. Each of the first two segments, B1 and B2, has eight B-channel bits. Each of the second two segments, D1 and D2, has 1 D-channel bit.

A problem is that there exist two different methods, or formats, for sending each word. These two formats are now described.

Figure 1:
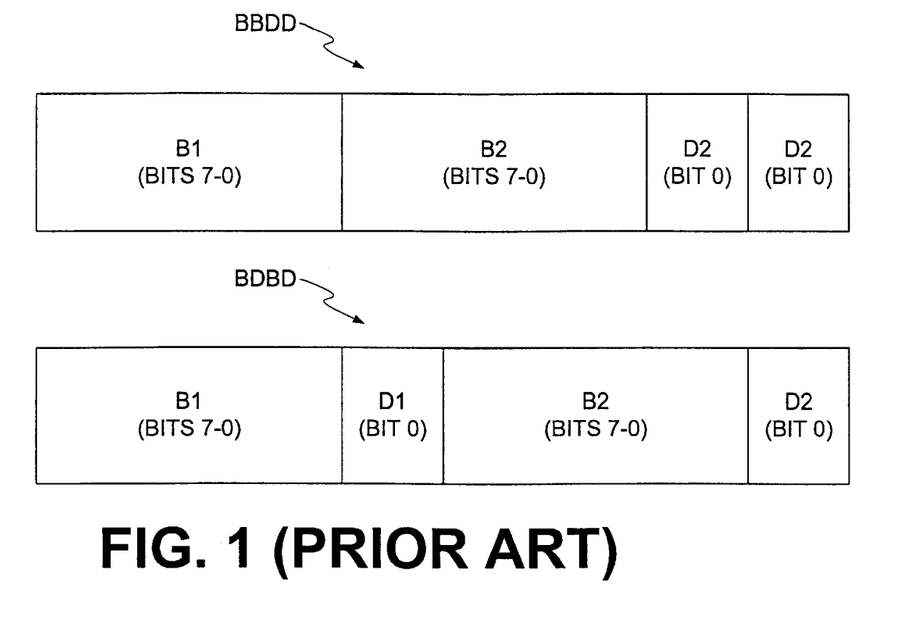
FIG. 1 is an illustration of two formats for an 18 bit word data as commonly used in the prior art.

Referring now to FIG. 1, the first format is also known as BBDD. As can be seen, the four segments of the word are transmitted in the sequence B1 B2 D1 D2. In the second format, also known as BDBD, the four segments of the word are transmitted in the sequence B1 D1 B2 D2. The difference in formats developed because the D-channels were often not used for signaling in ISDN. As such, since Time Domain Multiplexing (TDM) requires that the D-channel bits be included, they started being used for data bits for higher efficiency. The additional use resulted in the development of the second format.

Each device is programmed to communicate in only one of the two formats. The difference in the formats renders devices incompatible with each other. The whole point of network communication is that any device should be able to exchange data with any other device in the network.

BRIEF SUMMARY OF THE INVENTION

The present invention overcomes these problems and limitations of the prior art.

Generally, the present invention provides a method for rendering the data formats compatible with each other. In particular, the method of the invention interchanges the second segment with the third segment.

In addition, the invention provides a bit rearranging unit, that is placed in the path of the data. The bit rearranging unit receives a word, and retransmits it after interchanging the second segment with the third segment. This permits an operator to convert an associated network device, which operates in one of the two formats, to a device that instead operates in the other format.

Moreover, the invention provides a device that includes the bit rearranging unit. The device includes a controller, and memory with software made according to the invention. The software monitors whether received transmission is incompatible, and if so, directs the bit rearranging unit to switch formats.

The invention renders network devices compatible where they were previously not. In addition, the software permits the device to adapt to communication with the right one of the two data formats on the fly, without the intervention of an operator. This is especially advantageous for customer premise equipment (CPE), which is not easily accessible by servicing personnel.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides a unit and a method for rearranging bits in data words for compatibility among different data formats, and software for enabling the same. Various embodiments are now described with reference to the remaining drawings.

Figure 2:
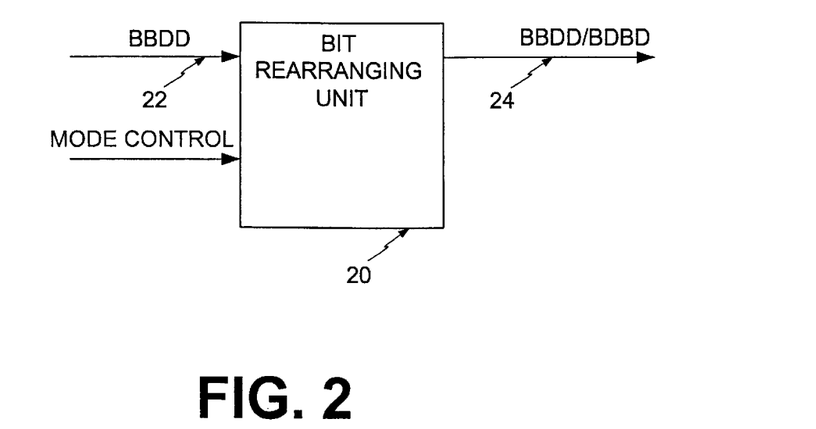
FIG. 2 is a diagram of a general embodiment of a bit rearranging unit made according to the present invention.

Referring now to FIG. 2, a general embodiment of the invention is described. A bit rearranging unit 20 receives data along an input line 22, and retransmits data along an output line 24.

It will be appreciated that the input line 22 and the output line 24 together constitute a single signal data path, and that the unit 20 is interposed in the data path. In that location, the unit 20 intercepts the data, and then retransmits it.

From input line 22, a data word is coming in the format BBDD is input in the unit 20 of the invention, which in turn outputs on the line 24 the same data word, in the format of either BBDD, or BDBD. The format of the word output on the line 24 is preferably determined by a mode control signal input in the unit 20. In other words, the mode control signal controls whether to enable format switching in the unit 20 or not.

The format BBDD on the input line 22 in FIG. 2 is only given as an example. The unit 20 could instead be receiving along the input line 22 a word in the format of BDBD. The mode control signal would again control whether to enable format switching in the unit 20 or not.

The mode control signal can be set once, by an operator. Alternately and preferably, the mode control signal is set adaptively and automatically, as is explained in more detail below.

Figure 3:
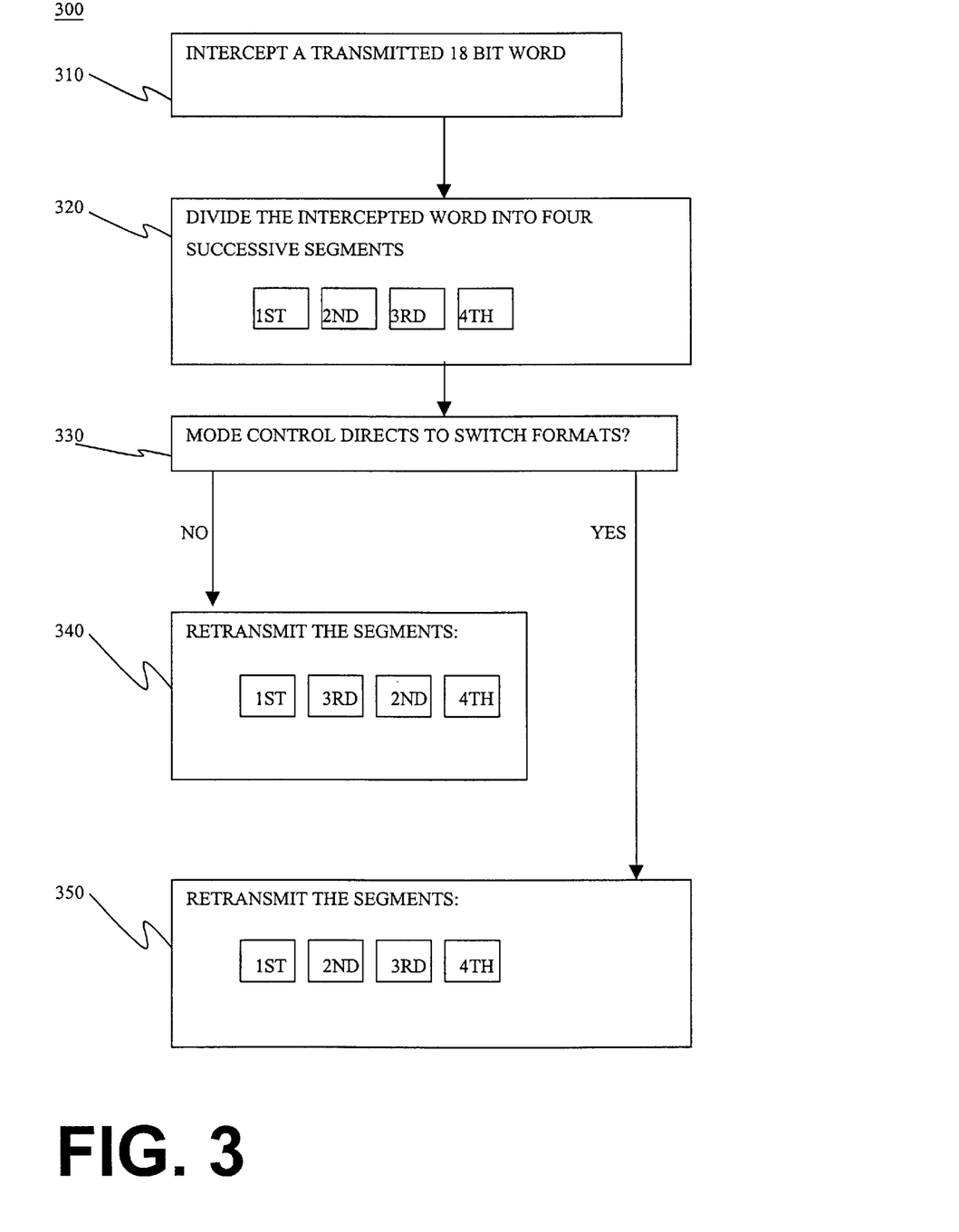
FIG. 3 a flowchart for illustrating another method according to the present invention.

Referring now to FIG. 3, a method 300 according to the invention is described.

According to box 310, and 18 bit word that is being transmitted serially along a signal data path is intercepted.

According to box 320, the intercepted word is divided into four successive segments, the first, second, third, and fourth.

Two of these segments, named B1 and B2, have 8 B-channel bits. The other two, named D1 and D2, have 1 D-channel bit.

In all cases of the method, the first 8 bits can be deemed to belong in the B1 segment, and the last one bit can be deemed to belong in the D2 segment. This will read correctly either one of the formats of FIG. 1.

A prior setting determines whether interception is as per the BBDD format or as per the BDBD format. In other words, a prior setting determines whether, after the data bits of the first B1 segment, the second segment is made from 8 bits, deemed to belong in the B2 segment, or from one bit, deemed to belong in the D1 segment. The setting also determines the third segment accordingly.

According to box 330, a mode control signal is consulted, for whether it directs to switch formats, i.e. the order of the bits that are to be retransmitted.

According to box 340, if directed to change formats, the data is retransmitted along the signal data path, in the order of first, third, second and fourth segments.

According to box 350, if not directed to change formats, the data is retransmitted along the signal data path in the order received, i.e., first, second, third and fourth segments.

Referring briefly now to FIG. 2, it will be appreciated that it represents a general embodiment for a single signal data path. In many embodiments, such as with telephones connected to networks, there are two data paths, often named RX and TX, for the two opposite flows of data. In that case, the invention provides a dual embodiment, which is now described.

Figure 4:
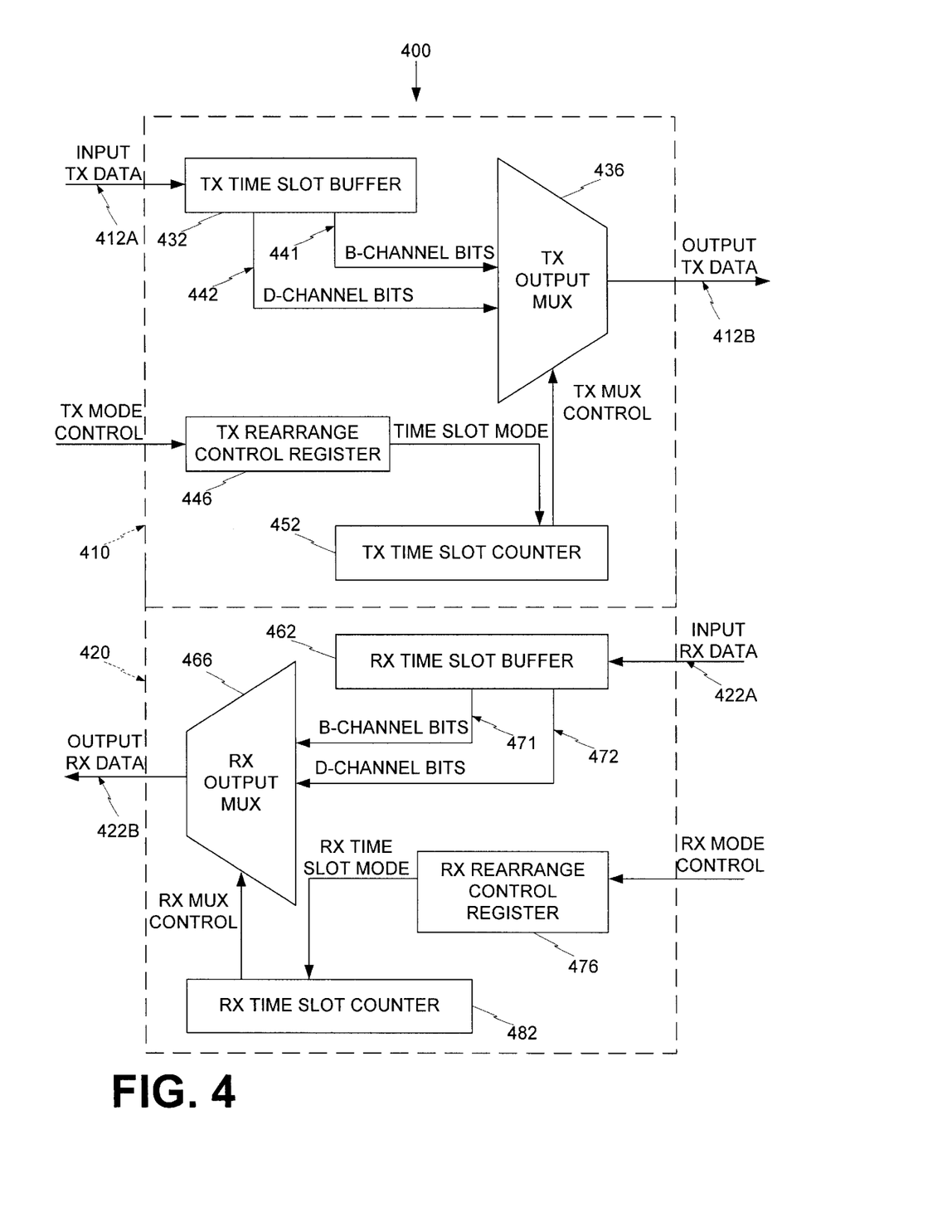
FIG. 4 is a block diagram of a dual bit rearranging unit made according to an embodiment of the present invention.

Referring now to FIG. 4, a dual bit rearranging unit 400 made according to an embodiment of the invention is described in more detail. It will be appreciated that the dual unit 400 includes two distinct single units, a TX bit rearranging unit 410, and RX bit rearranging unit 420. The dual unit is interposed in a TX line 412 A, 412B and an RX line 422 A, 422B.

One or both sides of the dual bit rearranging unit 400 is for connecting to a network. (If the other one is not for connecting to network, it is best intended for connecting to an end device.) If the right side of the dual bit rearranging unit 400 is connected to the network, then the INPUT RX DATA is received from the network, and the OUTPUT TX DATA is transmitted to the network. Other devices (not shown), such as a switch, may be interposed between the dual bit rearranging unit 400 and the network. The network can be a telephone network, a packet switched network, etc.

The unit 410 includes an input buffer 432 for receiving the arriving data signals TX INPUT DATA from line 412A. The input buffer has a plurality of registers for storing the received data signals.

A number of different embodiments are possible. There can be two registers, such as one for B-channel bits, and one for D-channel bits. Or four registers, one for each segment of the word. The input buffer 432 is preferably implemented by a TX time slot buffer 432.

The unit 410 also includes an output multiplexer 436 coupled with the input buffer 432. The multiplexer 436 is for receiving the data signals stored in the input buffer 432. The multiplexer 436 is additionally for transmitting the data signals of each register in an output order controlled by a multiplexer control signal TX MUX CONTROL. It will be appreciated that controlling the output order will yield either one of the formats of FIG. 1.

In the embodiment of FIG. 4, the input buffer is coupled with the output multiplexer by two data lines, 441 and 442. The line 441 couples to the register of the B-channel bits, and line 442 couples to the register of the D-channel bits. A plurality of such lines possible, depending on the chosen embodiment of registers.

As per the above, the stored data signals are deemed to form a word consisting of four successive segments, which have been received in an input order of first, second, third, and then fourth (same as in box 340). One state of the multiplexer control signal TX MUX CONTROL controls the output order to be first, third, second and then fourth (same as in box 350). In other words, the output order is such that the second segment and the third segment are interchanged from the input order. Preferably, another state of the multiplexer control signal TX MUX CONTROL does not change the order of any segments. This is true for going from either one of the two data formats of FIG. 1 to the other.

The unit 410 further includes a rearranging control register 446 for storing the mode control signal. The mode control signal is received externally to the unit 410, or set permanently internally, either by the wiring or by a value in a memory. The latter can be set up by software during configuration.

The unit 410 additionally includes generating means for generating the multiplexer control signal TX MUX CONTROL in response to the mode control signal. The preferred such means is a time slot counter 452. The counter 452 generates the multiplexer control signal TX MUX CONTROL in response to a time slot mode signal, which in turn is generated from the rearranging control register 446 in response to the mode control signal.

It will be appreciated that the unit 420 is a mirror image of the unit 410, except that it is for data being transmitted in the opposite direction. In other words, the components are repeated. More particularly, unit 420 includes a second input buffer 462 similar to input buffer 432, a second output multiplexer 466 similar to output multiplexer 436, a second rearranging control register 476 similar to rearranging control register 446, and a second time slot counter 482 similar to time slot counter 452. The second input buffer 462 is coupled with the second output multiplexer 466 via lines 471, 472. The second time slot counter 482 receives a signal RX TIME SLOT MODE, and generates a signal RX MUX CONTROL.

It will be appreciated that unit 410 is controlled by a mode control signal designated TX MODE CONTROL. In addition, unit 420 is controlled by a mode control signal designated RX MODE CONTROL. The two signals can be the same. In fact, if it is determined that data received along, say, line 422A is incompatible with what is expected, then the RX MODE CONTROL signal would be changed. That is usually also the ideal time to change the TX MODE CONTROL signal, as will be understood from the embodiment described next.

Figure 5:
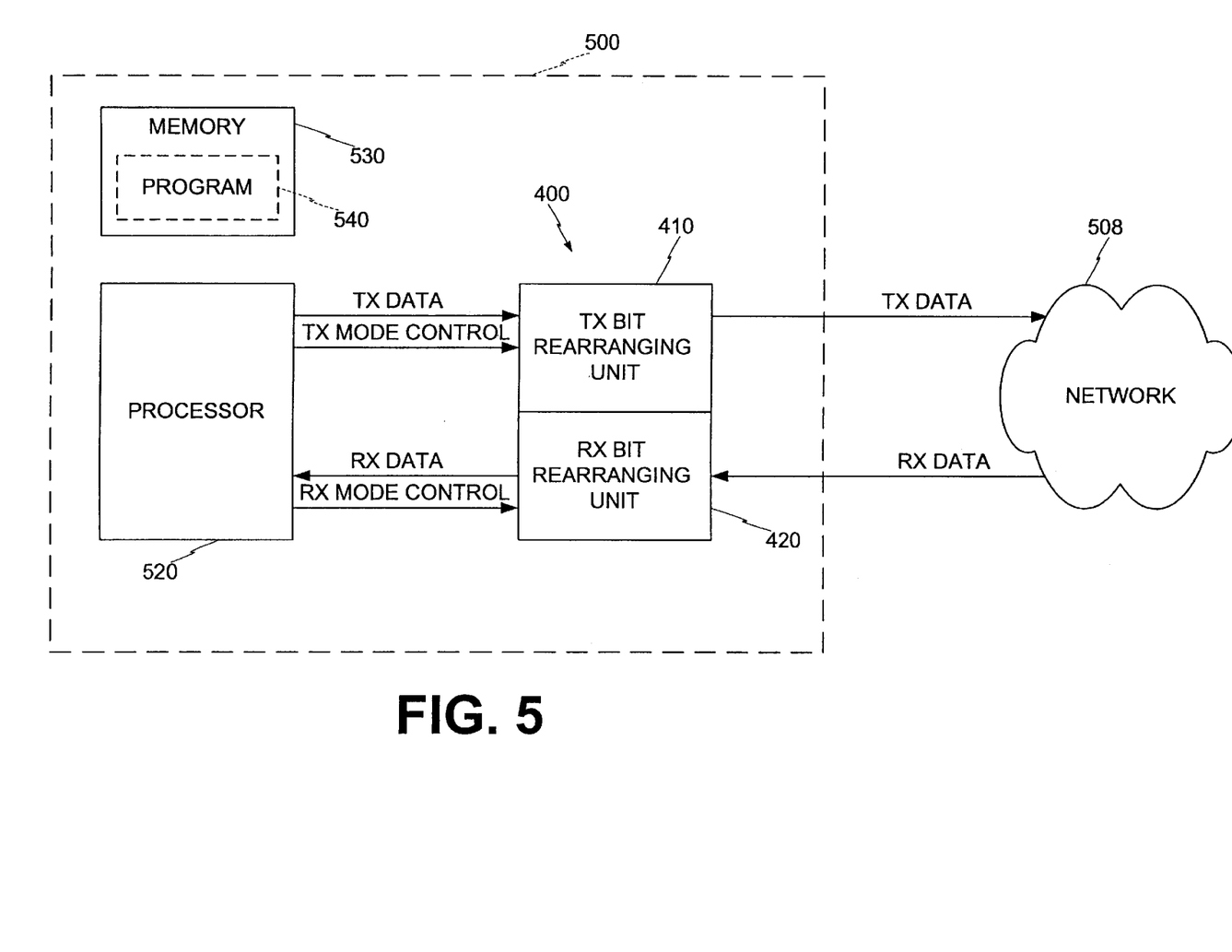
FIG. 5 is a block diagram of a device made according to another embodiment of the present invention.

Referring now to FIG. 5, a device 500 made according to another embodiment of the present invention is described. The device 500 is intended for connection to a network 508. The network 508 can be any network, such as a global worldwide network (Internet), a local area network (LAN), etc.

The device 500 can be a complete modem, intended for attaching to a personal computer or any other network end user device. In addition, the device 500 can be a gateway, a router, a field programmable gate array, or any other device intended for coupling to network 508. It is preferred that one device 500 is implemented for each port of a system.

The device 500 includes the processor 520. The processor 520 can be implemented by a microprocessor. The processor 520 produces at least one mode control signal. Not shown are other devices that could also be connected with the processor 520.

The device 500 also includes a computer readable medium 530, such as a memory 530. The processor 520 is coupled with the memory 530 for determining a content for the mode control signal (s). In one embodiment, a content for the mode control signal can be encoded as a value, permanently stored in the memory 530.

Preferably, the memory 530 stores a program 540. The processor 520 runs the program 540 to determine the content for the mode control signal(s). This permits the content to change adaptively.

The device 500 moreover additionally includes the dual bit rearranging unit 400 that was described with reference to FIG. 4. The dual bit rearranging unit 400 is made from two single bit rearranging units 410, 420.

The bit rearranging unit 410 is coupled with the processor 520. The processor 520 transmits to unit 410 a mode control signal TX MODE CONTROL. The processor 520 produces data signals TX data, and transmits them to unit 410 for retransmitting to the network 508. The bit rearranging unit 410 rearranges an order of the data signals it receives, before transmitting them, in a manner depending on the TX MODE CONTROL signal. In the preferred embodiment, one state of the TX MODE CONTROL signal effectuates no rearranging, while another state interchanges the order of the second and third segments of an 18 bit word.

The bit rearranging unit 420 is coupled with the processor 520. The processor 520 transmits to unit 420 a mode control signal RX MODE CONTROL. The unit 420 receives data signals RX DATA from the network 508, and transmits them to the processor 520. Before transmitting them, the bit rearranging unit 420 rearranges an order of the received data signals in a manner depending on the RX MODE CONTROL signal.

The processor 520 evaluates the received RX data signals for discrepancies compared to preset signal schemes. If the discrepancies exceed a preset threshold, the program outputs a changing content for the mode control signal. This can be implemented by outputting a mode control change flag. Upon perceiving this, the processor 520 will change the state of RX MODE CONTROL signal, which will hopefully fix the problem. If the problem is fixed, then that is an advantageous time for also changing the state of the RX MODE CONTROL signal.

The processor 520 preferably accomplishes this by running the program 540 in memory 530. The program 540 is now described in more detail. The program 540 is most advantageously implemented as a computer program.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art. Often, for the sake of convenience only, it is preferred to implement and describe a program as various interconnected distinct software modules or features, also known individually as softwares. This is not necessary, however, and there may be cases where various softwares are equivalently aggregated into a single program with unclear boundaries.

In any event, the software modules or features of the present invention can be implemented by themselves, or in combination with others. Again, the combination can result in distinct software modules, or ones with blurred boundaries.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that the program of the invention need not reside in a single memory, or even a single machine. Various portions, modules or features of it can reside in separate memories, or even separate machines. The separate machines may be connected directly, or through a network, such as a local access network (LAN), or a global network, such as what is presently known as Internet-1. Similarly, the users need not be collocated with each other, but each only with a machine that houses a portion of the program.

The preferred embodiment of program 540 is now described. The preferred embodiment of program 540 includes software for analyzing received frames of bits against preset signal schemes. The preferred signal schemes to check for are preset frame checks. The data signals encode bits, and the bits are aggregated into frames. Typically there are 256 bits in every frame. Preset frame checks check frames for validity.

The program 540 further includes software for discarding frames that do not meet the preset frame checks.

The program 540 moreover includes software for updating an error frame counter, every time a frame is discarded. This can be accomplished by a loop.

The program 540 additionally includes outputting software for outputting a mode control change flag if the error frame counter exceeds a preset threshold. A useful threshold is three successive frames. Other thresholds can be implemented.

More methods according to the invention are now described. This disclosure is to be taken as a whole. The units, devices, and software of the invention are capable of performing methods of the invention.

Figure 6:
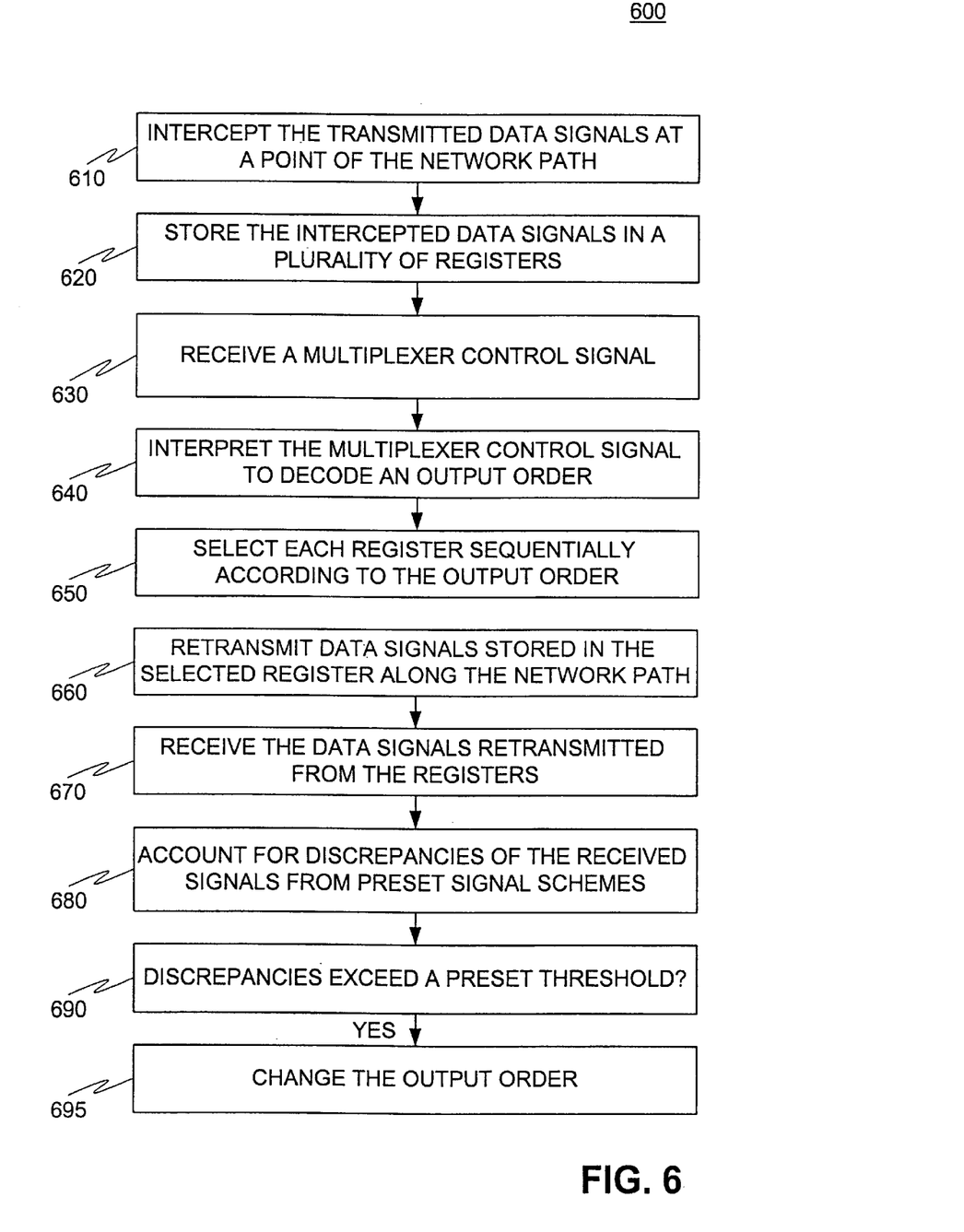
FIG. 6 is a flowchart for illustrating a method according to the present invention.

Referring now to FIG. 6, a flowchart 600 is used for illustrating a method according to the present invention. The method is for rearranging an order of data signals transmitted serially along a network signal path.

According to a box 610, the transmitted data signals are intercepted at a point of the network signal path.

According to a box 620, the intercepted data signals are stored in a plurality of registers.

According to an optional box 630, a multiplexer control signal is received. Then according to box 640, the multiplexer control signal is interpreted to decode an output order.

According to a box 650, each register is selected sequentially according to the output order. If the contents of boxes 630 and 640 had not been performed, then the output order for box 650 could instead be a preset output order.

According to a box 660 the data signals stored in the selected register are retransmitted along the network signal path. In other words, they are reinjected at the point of interception in the network signal path.

The invention further comprises additional method steps for possibly adapting reception and transmission to a different data format. These additional steps are presented as being in the same method with those in flowchart 600. That is not necessary, however, and they could be implemented separately.

According to a box 670, the data signals received from the registers a received.

According to a box 680, there is accounting for discrepancies of the received signals from preset signal schemes.

According to a box 690, it is inquired whether the accounted for discrepancies exceed a preset threshold.

According to a box 695, if the accounted for discrepancies exceed the preset threshold of box 690, the output order for box 650 is changed. This can be accomplished by changing the multiplexer control signal, which is subsequently received at box 630.

Figure 7:
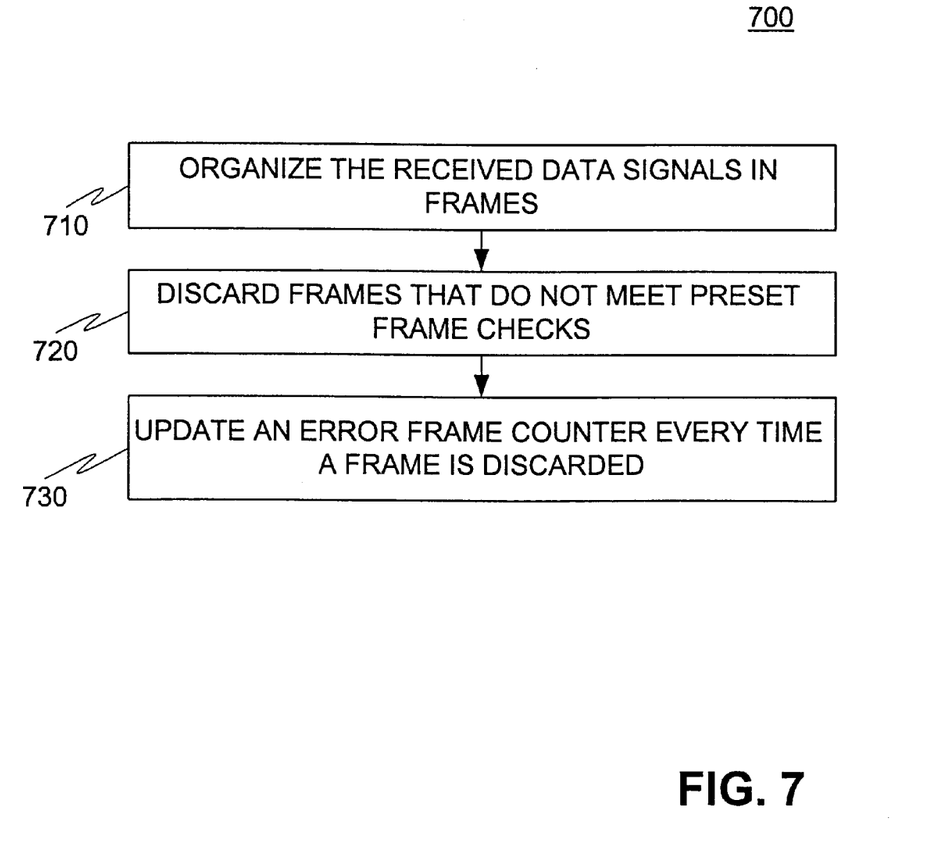
FIG. 7 is a flowchart for illustrating a box 680 of FIG. 6.

FIG. 7 is a flowchart for illustrating possible steps 700 for accomplishing accounting for discrepancies as called for in box 680 of FIG. 6. In that case, box 690 is implemented by assigning a preset threshold for endeavor frame counter.

According to a box 710, the received data signals are organized in frames.

According to a box 720, the frames that cannot meet preset frame checks are discarded.

According to a box 730, the error frame counter is updated every time a frame is discarded.

The method of the invention may introduce delay, by frame slip, caused by the buffering and retransmission. This can be advantageously compensated for a using the switching functions of a suitable processor and a suitable switch. The invention can be practiced by a field programmable gate array (FPGA), the suitable processor and a suitable switch can sandwich the PGA. While the PGA would issue consistent timing to these devices, they in turn will switch the incoming and outgoing channels, so that the incoming and outgoing ISDN frame timing is preserved.

A person skilled in the art will be able to practice the present invention in view of the present description, where numerous details have been set forth in order to provide a more thorough understanding of the invention. In other instances, well-known features have not been described in detail in order not to obscure unnecessarily the invention. In interpreting this document, words should be accorded a meaning consistent with what is found in common non-technical dictionaries, and also in technical dictionaries for the art of the invention. In addition, the meanings of the words in this document can be augmented from their particular usage in this document, especially where this document expressly gives them a specific meaning.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A bit rearranging unit for receiving from a network data signals arriving serially arranged in a first order and for retransmitting the data signals serially arranged in a second order, the unit comprising:

an input buffer for receiving the arriving data signals from the network, the input buffer having a plurality of registers for storing the received data signals; and an output multiplexer coupled with the input buffer for receiving the stored data signals and for transmitting the data signals of each register in an output order controlled by a multiplexer control signal; and a processor directing the output multiplexer to organize the data signals into a first known order, detecting discrepancies with the data signals when organized in the first known order; and dynamically directing the output multiplexer to rearrange the data signals into a second known order according to an amount of detected discrepancies.

2. The unit of claim 1, wherein the processor organizes the data signals into frames, discards frames that do not meet preset frame checks, counts the number of discarded frames, and directs the output multiplexer to rearrange the data signals into the second known order when the number of discarded frames exceeds a present threshold.

3. The unit of claim 1, further comprising:

a time slot counter for generating the multiplexer control signal in response to a time slot mode signal.

4. The unit of claim 1, further comprising:

a rearranging control register for storing a mode control signal; and generating means for generating the multiplexer control signal in response to the mode control signal.

5. The unit of claim 4, wherein the input buffer is a time slot buffer, a rearranging control register generates a time slot mode signal in response to the mode control signal, and the generating means includes a time slot counter for generating the multiplexer control signal in response to the time slot mode signal.

6. The unit of claim 1, wherein the data signals are deemed to form a word consisting of four successive segments received in an input order of first, second, third, and then fourth, and wherein one state of the multiplexer control signal controls the output order to be first, third, second and then fourth.

7. The unit of claim 6, wherein
the first and second segments consist of 8 B-channel bits each, and
the third and fourth segments consist of 1 D-channel bit each.

8. The unit of claim 6, wherein
the first and third segments consist of 8 B-channel bits each, and
the second and fourth segments consist of 1 D-channel bit each.

9. A bit rearranging unit for receiving data signals arriving serially arranged in a first order and for retransmitting to a network the data signals serially arranged in a second order, the unit comprising:
an input buffer for receiving the arriving data signals, the input buffer having a plurality of registers for storing the received data signals; and
an output multiplexer coupled with the input buffer for receiving the stored data signals and for transmitting to the network the data signals of each register in an output order controlled by a multiplexer control signal; and
a processor organizing the received data signals into a frame format, detecting discrepancies with the data signals in the frame format; and automatically directing the output multiplexer to rearrange the received data signals from the first order to the second order according to an amount of detected discrepancies in the frame format.

10. The unit of claim 9, wherein
the processor discards frames that do not meet preset frame checks, counts the number of discarded frames, and directs the output multiplexer to rearrange the received data signals into the second order when the number of discarded frames exceeds a present threshold.

11. The unit of claim 9, further comprising:
a time slot counter for generating the multiplexer control signal in response to a time slot mode signal.

12. The unit of claim 9, further comprising:
a rearranging control register for storing a mode control signal; and
generating means for generating the multiplexer control signal in response to the mode control signal.

13. The unit of claim 12, wherein
the input buffer is a time slot buffer,
a rearranging control register generates a time slot mode signal in response to the mode control signal, and
the generating means includes a time slot counter for generating the multiplexer control signal in response to the time slot mode signal.

14. The unit of claim 13, wherein
the data signals are deemed to form a word consisting of four successive segments received in an input order of first, second, third, and then fourth, and
wherein one state of the multiplexer control signal controls the output order to be first, third, second and then fourth.

15. The unit of claim 14, wherein
the first and second segments consist of 8 B-channel bits each, and
the third and fourth segments consist of 1 D-channel bit each.

16. The unit of claim 14, wherein the first and third segments consist of 8 B-channel bits each, and the second and fourth segments consist of 1 D-channel bit each.

17. The unit of claim 9, further comprising:
a second input buffer for receiving second data signals arriving from the network, the second input buffer having a plurality of second registers for storing the received second data signals; and
a second output multiplexer coupled with the second input buffer for receiving the stored second data signals and for transmitting the second data signals of each second register in a second output order controlled by a second multiplexer control signal.

18. A device comprising:
a processor for producing data signals and a mode control signal; and
a bit rearranging unit coupled with the processor for transmitting to a network the data signals received from the processor, the bit rearranging unit rearranging an order of the received data signals before transmitting them in a manner depending on the mode control signal;
the processor directing the bit rearranging unit to organize the received data signals into a first known bit order and detecting discrepancies with the data signals when organized in the first known bit order, the processor automatically on the fly directing the bit rearranging unit to rearrange the received data signals into a second known order according to an amount of detected discrepancies.

19. The device of claim 18, wherein
the received data signals are deemed to form a word consisting of four successive segments received in an input order of first, second, third, and then fourth, and
wherein one state of the multiplexer control signal controls the output order to be first, third, second and then fourth.

20. The device of claim 19, wherein
the first and second segments consist of 8 B-channel bits each, and
the third and fourth segments consist of 1 D-channel bit each.

21. The device of claim 19, wherein
the first and third segments consist of 8 B-channel bits each, and
the second and fourth segments consist of 1 D-channel bit each.

22. A device comprising:
a processor for producing a mode control signal; and
a bit rearranging unit coupled with the processor for transmitting to the processor data signals received signals from a network,
wherein the bit rearranging unit rearranges an order of the received data signals before transmitting them in a manner depending on the mode control signal;
the processor detecting an amount of discrepancies in the received data signals and on the fly changing the mode control signal according to the amount of detected discrepancies causing an output multiplexer to rearrange the order of the received data signals.

23. The device of claim 22, wherein
the data signals received from the network are deemed to form a word consisting of four successive segments received in an input order of first, second, third, and then fourth, and wherein one state of the multiplexer control signal controls the output order to be first, third, second and then fourth.

24. The device of claim 23, wherein the first and second segments consist of 8 B-channel bits each, and the third and fourth segments consist of 1 D-channel bit each.

25. The device of claim 23, wherein the first and third segments consist of 8 B-channel bits each, and the second and fourth segments consist of 1 D-channel bit each.

26. The device of claim 22, further comprising:

a computer readable medium, and wherein the processor is coupled with the computer readable medium for determining a content for the mode control signal.

27. The device of claim 26, further comprising:

a program stored in the computer readable medium, wherein the processor runs the program to determine the content of the mode control signal, and wherein the program evaluates the received data signals for discrepancies compared to preset signal schemes, and if the discrepancies exceed a preset threshold, the program outputs a changing content for the mode control signal.

28. A method comprising:

intercepting a transmitted 18 bit word transmitted serially along a signal data path;

dividing the intercepted word into four successive segments, a first and second segment being two segments of 8 B-channel bits and a third and fourth segment being two segments of 1 D-channel bit;

arranging the bits in a first order of the first, third, second and fourth segments when a mode control signal indicates a first format;

comparing the bits in the arranged first order with a known scheme for the first format and changing the mode control signal on the fly to indicate a second format when the bits arranged in the first order do not correspond with the known scheme;

rearranging the bits in a second order of the first, second, third and fourth segments when the mode control signal indicates the second format.

29. The method of claim 28, wherein the first and second segments consist of the B-channel bits, and the third and fourth segments consist of the D-channel bit.

30. The method of claim 28, wherein the first and third segments consist of the B-channel bits, and the second and fourth segments consist of the D-channel bit.

31. A method for rearranging an order of data signals transmitted serially along a network signal path, the method comprising:

intercepting the transmitted data signals at a point of the network signal path;

storing the intercepted data signals in a plurality of registers;

selecting each register sequentially according to an output order;

retransmitting data signals stored in the selected register along the network signal path;

comparing the data signals in the output order with a known format; and dynamically on the fly selecting each register sequentially according to a different output order when the data signals do not correspond with the known format.

32. The method of claim 31, further comprising:

receiving a multiplexer control signal; and interpreting the multiplexer control signal to decode the output order.

33. The method of claim 31, further comprising:

receiving the data signals retransmitted from the registers;

accounting for discrepancies of the received signals from preset signal schemes; and if the accounted for discrepancies exceed a preset threshold, changing the output order.

34. The method of claim 33, wherein accounting for discrepancies includes:

organizing the received data signals in frames;

discarding frames that do not meet preset frame checks; and updating an error frame counter every time a frame is discarded.

35. A bit rearranging unit for receiving from a network data signals arriving serially arranged in a first order and for retransmitting the data signals serially arranged in a second order, the unit comprising:

receiving means for receiving the arriving data signals from the network having a plurality of registers for storing the received data signals;

multiplexing means coupled with the receiving means for receiving the stored data signals and for transmitting the data signals of each register in an output order controlled by a multiplexer control signal;

processing means comparing the data signals serially arriving in the first order with a known signaling scheme and on the fly causing the multiplexer means to transmit the data signals in the second order when the data signals serially arriving in the first order do not correspond with the known signaling scheme.

* * * * *

UNITED STATES PATENT AND TRADEMARK OFFICE
CERTIFICATE OF CORRECTION

PATENT NO.   : 6,765,926 B1
DATED        : July 20, 2004
INVENTOR(S)  : Price et al.

It is certified that error appears in the above-identified patent and that said Letters Patent is hereby corrected as shown below:

Column 10,
Line 63, "causing an output multiplexer" should read -- causing the output multiplexer --.

Signed and Sealed this

Twenty-eighth Day of December, 2004

JON W. DUDAS
*Director of the United States Patent and Trademark Office*